US008301453B2

(12) United States Patent
Sharma

(10) Patent No.: US 8,301,453 B2
(45) Date of Patent: Oct. 30, 2012

(54) WATERMARK SYNCHRONIZATION SIGNALS CONVEYING PAYLOAD DATA

(75) Inventor: Ravi K. Sharma, Hillsboro, OR (US)

(73) Assignee: Digimarc Corporation, Beaverton, OR (US)

( * ) Notice: Subject to any disclaimer, the term of this patent is extended or adjusted under 35 U.S.C. 154(b) by 463 days.

(21) Appl. No.: 12/692,451

(22) Filed: Jan. 22, 2010

(65) Prior Publication Data

US 2010/0322466 A1 Dec. 23, 2010

Related U.S. Application Data

(63) Continuation of application No. 11/302,974, filed on Dec. 13, 2005, now Pat. No. 7,657,058, which is a continuation-in-part of application No. 10/032,282, filed on Dec. 20, 2001, now Pat. No. 6,975,744, said application No. 11/302,974 is a continuation-in-part of application No. 10/333,344, filed as application No. PCT/US01/22173 on Jul. 12, 2001, now Pat. No. 7,319,775.

(60) Provisional application No. 60/257,924, filed on Dec. 21, 2000.

(51) Int. Cl.
  *G10L 21/00* (2006.01)
  *H04K 1/00* (2006.01)
(52) U.S. Cl. ...................................................... 704/270
(58) Field of Classification Search ............... 704/200.1, 704/270; 381/73.1; 380/252, 287; 713/176
  See application file for complete search history.

(56) References Cited

U.S. PATENT DOCUMENTS

| | | | |
|---|---|---|---|
| 4,807,031 A | 2/1989 | Broughton et al. | 358/142 |
| 5,613,004 A | 3/1997 | Cooperman et al. | 380/28 |
| 5,636,292 A | 6/1997 | Rhoads | 382/232 |
| 5,832,119 A | 11/1998 | Rhoads | 382/232 |
| 5,835,639 A | 11/1998 | Honsinger et al. | 382/278 |
| 5,862,260 A | 1/1999 | Rhoads | 382/232 |
| 5,915,027 A | 6/1999 | Cox et al. | 380/54 |
| 5,949,055 A | 9/1999 | Fleet et al. | 235/469 |
| 6,011,857 A | 1/2000 | Sowell et al. | 382/100 |
| 6,044,182 A | 3/2000 | Daly et al. | 382/284 |
| 6,122,403 A | 9/2000 | Rhoads | 382/233 |
| 6,175,639 B1 | 1/2001 | Satoh et al. | 382/100 |
| 6,226,387 B1 | 5/2001 | Tewfik et al. | 382/100 |
| 6,229,924 B1 | 5/2001 | Rhoads et al. | 382/232 |
| 6,233,347 B1 | 5/2001 | Chen et al. | 382/100 |
| 6,266,452 B1 | 7/2001 | McGuire | 382/294 |
| 6,282,300 B1 | 8/2001 | Bloom et al. | 382/100 |
| 6,307,949 B1 | 10/2001 | Rhoads | 382/100 |
| 6,311,214 B1 | 10/2001 | Rhoads | 709/217 |
| 6,332,030 B1 | 12/2001 | Manjunath et al. | 382/100 |
| 6,334,187 B1 | 12/2001 | Kadono | 713/176 |
| 6,353,672 B1 | 3/2002 | Rhoads | 382/100 |
| 6,359,998 B1 | 3/2002 | Cooklev | 382/100 |
| 6,381,341 B1 | 4/2002 | Rhoads | 382/100 |
| 6,385,329 B1 | 5/2002 | Sharma et al. | 382/100 |
| 6,408,082 B1 | 6/2002 | Rhoads et al. | 382/100 |
| 6,421,070 B1 | 7/2002 | Ramos et al. | 345/763 |
| 6,424,725 B1 | 7/2002 | Rhoads et al. | 382/100 |
| 6,442,285 B2 | 8/2002 | Rhoads et al. | 382/100 |
| 6,456,727 B1 | 9/2002 | Echizen et al. | 382/100 |
| 6,516,079 B1 | 2/2003 | Rhoads et al. | 382/100 |
| 6,522,769 B1 | 2/2003 | Rhoads et al. | 382/100 |
| 6,522,770 B1 | 2/2003 | Seder et al. | 382/100 |
| 6,535,617 B1 | 3/2003 | Hannigan et al. | 382/100 |
| 6,542,927 B2 | 4/2003 | Rhoads | 709/217 |
| 6,553,129 B1 | 4/2003 | Rhoads | 382/100 |
| 6,556,689 B1 | 4/2003 | Xia et al. | 382/100 |
| 6,560,349 B1 | 5/2003 | Rhoads | 382/100 |
| 6,563,935 B1 | 5/2003 | Echizen et al. | 382/100 |
| 6,563,937 B1 | 5/2003 | Wendt | 382/100 |
| 6,567,533 B1 | 5/2003 | Rhoads | 382/100 |
| 6,567,535 B2 | 5/2003 | Rhoads | 382/100 |
| 6,577,747 B1 | 6/2003 | Kalker et al. | 382/100 |
| 6,580,808 B2 | 6/2003 | Rhoads | 382/100 |
| 6,590,996 B1 | 7/2003 | Reed et al. | 382/100 |
| 6,611,607 B1 | 8/2003 | Davis et al. | 382/100 |
| 6,614,914 B1 | 9/2003 | Rhoads et al. | 382/100 |
| 6,639,997 B1 | 10/2003 | Katsura et al. | 382/100 |
| 6,647,128 B1 | 11/2003 | Rhoads | 382/100 |
| 6,647,130 B2 | 11/2003 | Rhoads | 382/100 |
| 6,650,761 B1 | 11/2003 | Rodriguez et al. | 382/100 |

(Continued)

FOREIGN PATENT DOCUMENTS

EP  0891071 A2  1/1999

(Continued)

OTHER PUBLICATIONS

Chae et al, "A Robust Embedded Data from Wavelet Coefficients," Proc. SPIE vol. 3312: Storage and Retrieval for Image and Video Databases VI, Dec. 1997, pp. 308-317.

(Continued)

*Primary Examiner* — Andrew W Johns

(57) ABSTRACT

Steganographic synchronization signals (sometimes termed "orientation signals," "marker signals," reference signals," "grid signals," "calibration signals," etc.) are sometimes included with digital watermarking signals to aid in correct decoding of the object thereby marked (e.g., a digital image file, audio clip, document, etc.). Digital watermark detection systems sometimes fail if the object encompasses several separately-watermarked components (e.g., a scanned magazine page with several different images, or photocopy data resulting from scanning while several documents are on the photocopier platen). Each component may include its own synchronization signal, confusing the detection system. In accordance with certain embodiments, this problem is addressed by a proximity-based approach, and/or a multiple grid-based approach. In accordance with other embodiments, the synchronization signal can—itself—convey watermark information, so it serves both a synchronization and a payload-conveyance function.

6 Claims, 3 Drawing Sheets

U.S. PATENT DOCUMENTS

| | | |
|---|---|---|
| 6,665,418 B1 | 12/2003 | Honsinger .................... 382/100 |
| 6,671,388 B1 | 12/2003 | Op De Beeck et al. ....... 382/100 |
| 6,674,873 B1 | 1/2004 | Donescu et al. .............. 382/100 |
| 6,678,390 B1 | 1/2004 | Honsinger .................... 382/100 |
| 6,681,028 B2 | 1/2004 | Rodriguez et al. ............ 382/100 |
| 6,681,029 B1 | 1/2004 | Rhoads ......................... 382/100 |
| 6,693,965 B1 | 2/2004 | Inoue et al. ............... 375/240.19 |
| 6,694,042 B2 | 2/2004 | Seder et al. .................. 382/100 |
| 6,694,043 B2 | 2/2004 | Seder et al. .................. 382/100 |
| 6,700,990 B1 | 3/2004 | Rhoads ......................... 382/100 |
| 6,700,995 B2 | 3/2004 | Reed ............................. 382/100 |
| 6,704,869 B2 | 3/2004 | Rhoads et al. ................ 713/176 |
| 6,718,046 B2 | 4/2004 | Reed et al. .................... 382/100 |
| 6,718,047 B2 | 4/2004 | Rhoads ......................... 382/100 |
| 6,721,440 B2 | 4/2004 | Reed et al. .................... 382/100 |
| 6,721,459 B1 | 4/2004 | Honsinger et al. ........... 382/263 |
| 6,737,957 B1 * | 5/2004 | Petrovic et al. .............. 340/5.86 |
| 6,760,463 B2 | 7/2004 | Rhoads ......................... 382/100 |
| 6,763,123 B2 | 7/2004 | Reed et al. .................... 382/100 |
| 6,768,809 B2 | 7/2004 | Rhoads et al. ................ 382/100 |
| 6,775,392 B1 | 8/2004 | Rhoads ......................... 382/100 |
| 6,798,894 B2 | 9/2004 | Rhoads ......................... 382/100 |
| 6,813,366 B1 | 11/2004 | Rhoads ......................... 382/100 |
| 6,879,701 B1 | 4/2005 | Rhoads ......................... 382/100 |
| 6,917,724 B2 | 7/2005 | Seder et al. ................... 382/321 |
| 6,920,232 B2 | 7/2005 | Rhoads ......................... 382/100 |
| 6,944,313 B1 | 9/2005 | Donescu ....................... 382/100 |
| 6,947,571 B1 | 9/2005 | Rhoads et al. ................ 382/100 |
| 6,975,733 B1 | 12/2005 | Choi et al. .................... 381/100 |
| 6,975,744 B2 | 12/2005 | Sharma et al. ................ 382/100 |
| 6,975,746 B2 | 12/2005 | Davis et al. ................... 382/100 |
| 6,983,058 B1 | 1/2006 | Fukuoka et al. .............. 382/100 |
| 6,988,202 B1 | 1/2006 | Rhoads et al. ................ 713/176 |
| 6,996,252 B2 | 2/2006 | Reed et al. .................... 382/100 |
| 7,003,731 B2 | 2/2006 | Rhoads et al. ................ 715/768 |
| 7,006,555 B1 | 2/2006 | Srinivasan .................... 375/133 |
| 7,024,016 B2 | 4/2006 | Rhoads et al. ................ 382/100 |
| 7,027,614 B2 | 4/2006 | Reed ............................. 382/100 |
| 7,035,427 B2 | 4/2006 | Rhoads ......................... 382/100 |
| 7,044,395 B1 | 5/2006 | Davis et al. ................... 235/494 |
| 7,051,086 B2 | 5/2006 | Rhoads et al. ................ 709/219 |
| 7,054,465 B2 | 5/2006 | Rhoads ......................... 382/100 |
| 7,062,069 B2 | 6/2006 | Rhoads ......................... 382/100 |
| 7,095,871 B2 | 8/2006 | Jones et al. ................... 382/100 |
| 7,111,170 B2 | 9/2006 | Hein et al. .................... 713/176 |
| 7,113,614 B2 | 9/2006 | Rhoads ......................... 382/100 |
| 7,139,408 B2 | 11/2006 | Rhoads et al. ................ 382/100 |
| 7,158,654 B2 | 1/2007 | Rhoads ......................... 382/100 |
| 7,164,780 B2 | 1/2007 | Brundage et al. ............. 382/100 |
| 7,171,016 B1 | 1/2007 | Rhoads ......................... 382/100 |
| 7,174,031 B2 | 2/2007 | Rhoads et al. ................ 382/107 |
| 7,177,443 B2 | 2/2007 | Rhoads ......................... 382/100 |
| 7,213,757 B2 | 5/2007 | Jones et al. ............... 235/462.01 |
| 7,224,819 B2 | 5/2007 | Levy et al. .................... 382/100 |
| 7,248,717 B2 | 7/2007 | Rhoads ......................... 382/100 |
| 7,261,612 B1 | 8/2007 | Hannigan et al. ............. 446/175 |
| 7,305,104 B2 | 12/2007 | Carr et al. ..................... 382/100 |
| 7,308,110 B2 | 12/2007 | Rhoads ......................... 382/100 |
| 7,313,251 B2 | 12/2007 | Rhoads ......................... 382/100 |
| 7,319,775 B2 | 1/2008 | Sharma et al. ................ 382/100 |
| 7,330,564 B2 | 2/2008 | Brundage et al. ............. 382/100 |
| 7,369,678 B2 | 5/2008 | Rhoads ......................... 382/100 |
| 7,377,421 B2 | 5/2008 | Rhoads ......................... 235/375 |
| 7,391,880 B2 | 6/2008 | Reed et al. .................... 382/100 |
| 7,406,214 B2 | 7/2008 | Rhoads et al. ................ 382/289 |
| 7,412,072 B2 | 8/2008 | Sharma et al. ................ 382/100 |
| 7,424,131 B2 | 9/2008 | Alattar et al. ................. 382/100 |
| 7,427,030 B2 | 9/2008 | Jones et al. ................... 235/491 |
| 7,433,491 B2 | 10/2008 | Rhoads ......................... 382/100 |
| 7,444,000 B2 | 10/2008 | Rhoads ......................... 382/100 |
| 7,444,392 B2 | 10/2008 | Rhoads et al. ................ 709/219 |
| 7,450,734 B2 | 11/2008 | Rodriguez et al. ............ 382/100 |
| 7,460,726 B2 | 12/2008 | Levy et al. .................... 382/240 |
| 7,466,840 B2 | 12/2008 | Rhoads ......................... 382/100 |
| 7,486,799 B2 | 2/2009 | Rhoads ......................... 382/100 |
| 7,502,759 B2 | 3/2009 | Hannigan et al. ............. 705/51 |
| 7,508,955 B2 | 3/2009 | Carr et al. ..................... 382/100 |
| 7,515,733 B2 | 4/2009 | Rhoads ......................... 382/100 |
| 7,536,034 B2 | 5/2009 | Rhoads et al. ................ 382/107 |
| 7,537,170 B2 | 5/2009 | Reed et al. .................... 235/494 |
| 7,545,952 B2 | 6/2009 | Brundage et al. ............. 382/100 |
| 7,564,992 B2 | 7/2009 | Rhoads ......................... 382/100 |
| RE40,919 E | 9/2009 | Rhoads ......................... 382/232 |
| 7,602,978 B2 | 10/2009 | Levy et al. .................... 382/232 |
| 7,628,320 B2 | 12/2009 | Rhoads ......................... 235/375 |
| 7,643,649 B2 | 1/2010 | Davis et al. ................... 382/100 |
| 7,650,009 B2 | 1/2010 | Rhoads ......................... 382/100 |
| 7,653,210 B2 | 1/2010 | Rhoads ......................... 382/100 |
| 7,657,058 B2 | 2/2010 | Sharma ......................... 382/100 |
| 7,685,426 B2 | 3/2010 | Ramos et al. ................. 713/176 |
| 7,693,300 B2 | 4/2010 | Reed et al. .................... 382/100 |
| 7,697,719 B2 | 4/2010 | Rhoads ......................... 382/100 |
| 7,711,143 B2 | 5/2010 | Rhoads ......................... 382/100 |
| 7,738,673 B2 | 6/2010 | Reed ............................. 382/100 |
| 7,747,038 B2 | 6/2010 | Rhoads ......................... 382/100 |
| 7,751,588 B2 | 7/2010 | Rhoads ......................... 382/100 |
| 7,751,596 B2 | 7/2010 | Rhoads ......................... 382/115 |
| 7,756,290 B2 | 7/2010 | Rhoads ......................... 382/100 |
| 7,760,905 B2 | 7/2010 | Rhoads et al. ................ 382/100 |
| 7,762,468 B2 | 7/2010 | Jones et al. ................... 235/491 |
| 7,778,442 B2 | 8/2010 | Sharma et al. ................ 382/100 |
| 7,787,653 B2 | 8/2010 | Rhoads ......................... 382/100 |
| 7,792,325 B2 | 9/2010 | Rhoads et al. ................ 382/100 |
| 7,822,225 B2 | 10/2010 | Alattar ........................... 382/100 |
| 7,837,094 B2 | 11/2010 | Rhoads ......................... 235/375 |
| 7,945,781 B1 | 5/2011 | Rhoads ......................... 713/176 |
| 7,949,147 B2 | 5/2011 | Rhoads et al. ................ 382/100 |
| 7,953,270 B2 | 5/2011 | Rhoads ......................... 382/145 |
| 7,953,824 B2 | 5/2011 | Rhoads et al. ................ 709/219 |
| 7,957,553 B2 | 6/2011 | Ellingson et al. ............. 382/100 |
| 7,961,949 B2 | 6/2011 | Levy et al. .................... 382/190 |
| 7,970,166 B2 | 6/2011 | Carr et al. ..................... 382/100 |
| 7,970,167 B2 | 6/2011 | Rhoads ......................... 382/100 |
| 2001/0034705 A1 | 10/2001 | Rhoads et al. ................ 705/39 |
| 2001/0055407 A1 | 12/2001 | Rhoads ......................... 382/100 |
| 2002/0009208 A1 | 1/2002 | Alattar et al. ................. 382/100 |
| 2002/0114490 A1 | 8/2002 | Taniguchi et al. ............ 382/100 |
| 2002/0131076 A1 | 9/2002 | Davis ........................... 358/1.15 |
| 2002/0176003 A1 | 11/2002 | Seder et al. ................ 348/207.1 |
| 2002/0186886 A1 | 12/2002 | Rhoads ......................... 382/232 |
| 2002/0196272 A1 | 12/2002 | Ramos et al. ................. 345/738 |
| 2003/0028381 A1 * | 2/2003 | Tucker et al. ................. 704/273 |
| 2003/0040957 A1 | 2/2003 | Rodriguez et al. ............ 705/14 |
| 2003/0105730 A1 | 6/2003 | Rhoads et al. ................ 705/407 |
| 2003/0130954 A1 | 7/2003 | Carr et al. ..................... 705/60 |
| 2004/0005093 A1 | 1/2004 | Rhoads ......................... 382/232 |
| 2004/0190750 A1 | 9/2004 | Rodriguez et al. ............ 382/100 |
| 2004/0240704 A1 | 12/2004 | Reed ............................. 382/100 |
| 2004/0264733 A1 | 12/2004 | Rhoads et al. ................ 382/100 |
| 2005/0041835 A1 | 2/2005 | Reed et al. .................... 382/100 |
| 2005/0058318 A1 | 3/2005 | Rhoads ......................... 382/100 |
| 2005/0105726 A1 * | 5/2005 | Neubauer et al. ............. 380/201 |
| 2005/0192933 A1 | 9/2005 | Rhoads et al. ................ 707/2 |
| 2006/0013435 A1 | 1/2006 | Rhoads ......................... 382/100 |
| 2006/0041591 A1 | 2/2006 | Rhoads ......................... 707/104.1 |
| 2006/0251291 A1 | 11/2006 | Rhoads ......................... 382/100 |
| 2007/0055884 A1 | 3/2007 | Rhoads ......................... 703/176 |
| 2007/0108287 A1 | 5/2007 | Davis et al. ............... 235/462.01 |
| 2007/0276841 A1 | 11/2007 | Rhoads et al. ................ 707/10 |
| 2007/0276928 A1 | 11/2007 | Rhoads et al. ................ 709/219 |
| 2008/0121728 A1 | 5/2008 | Rodriguez ..................... 235/494 |
| 2008/0133555 A1 | 6/2008 | Rhoads et al. ................ 707/100 |
| 2008/0292134 A1 | 11/2008 | Sharma et al. ................ 382/100 |
| 2009/0012944 A1 | 1/2009 | Rodriguez et al. ............ 707/3 |
| 2009/0125475 A1 | 5/2009 | Rhoads et al. ................ 706/60 |
| 2009/0286572 A1 | 11/2009 | Rhoads et al. ................ 455/557 |
| 2010/0045816 A1 | 2/2010 | Rhoads ......................... 348/222.1 |
| 2010/0062819 A1 | 3/2010 | Hannigan et al. ............. 463/9 |
| 2010/0172540 A1 | 7/2010 | Davis et al. ................... 382/100 |
| 2010/0198941 A1 | 8/2010 | Rhoads ......................... 709/217 |
| 2011/0007936 A1 | 1/2011 | Rhoads ......................... 382/100 |
| 2011/0026777 A1 | 2/2011 | Rhoads et al. ................ 382/107 |
| 2011/0051998 A1 | 3/2011 | Rhoads ......................... 382/100 |
| 2011/0062229 A1 | 3/2011 | Rhoads ......................... 235/375 |
| 2011/0091066 A1 | 4/2011 | Alattar .......................... 382/100 |

FOREIGN PATENT DOCUMENTS

| EP | 09962578 A1 | 4/2000 |
|----|-------------|--------|
| EP | 1107180 A2 | 6/2001 |
| WO | WO 9743736 A1 | 11/1997 |
| WO | WO 9901980 A1 | 1/1999 |

OTHER PUBLICATIONS

Fleet et al, "Embedding Invisible Information in Color Images," IEEE Int. Conf. on Image Proc., Oct. 1997, vol. 1, pp. 532, 535.

Houn-Jyh et al, "Wavelet Based Digital Image Watermarking," Optics Express, vol. 3, No. 12, pp. 491-496, Dec. 7, 1998.

Hsu et al, "Multiresolution Watermarking for Digital Images," IEEE Trans. on Circuits and Systems II: Analog and Digital Signal Processing, vol. 45, No. 8, pp. 1097-1101, Aug. 1998.

Inoue, et al, "A Digital Watermark Based on the Wavelet Transform and its Robustness on Image Compression," Oct. 1998, Proc. IEEE Int. Conf. on Image Processing, vol. 2, pp. 391-395.

Inoue, et al, "A Digital Watermark Method Using the Wavelet Transform for Video Data," IEICE Trans. Fundamentals, vol. E83-A, No. 1, Jan. 2000, pp. 90-96.

Inoue, et al, "A Digital Watermark Method Using the Wavelet Transform for Video Data," May/Jun. 1999, Proc. IEEE Int. Symp. on Circuits and Systems, vol. 4, pp. 247-250.

Inoue, et al, "An Image Watermarking Method Based on the Wavelet Transform," 1999, Pro. IEEE Int. Conf. on Image Processing, vol. 1, pp. 296-300.

Kaewkamnerd, et al, "Wavelet Based Watermarking Detection Using Multiresolution Image Registration," Sep. 2000, TENCON 2000, Proc., vol. 2, pp. 171-175.

Kim, et al, "A Robust Wavelet-Based Digital Watermarking Using Level-Adaptive Thresholding," IEEE Proc. Int. Conf. on Image Processing, Oct. 1999, vol. II, pp. 226-230.

Kim, et al, "Wavelet Based Watermarking Method for Digital Images Using the Human Visual System," IEEE Proc. Int. Symp. on Circuits and Systems, May/Jun. 1999, vol. IV, pp. 80-83.

Kundur, et al, "A Robust Digital Image Watermarking Method Using Wavelet-Based Fusion," Int. Conf. on Image Proc., Oct. 1997, pp. 544-547.

Kundur, et al, "Digital Watermarking Using Multiresolution Wavelet Decomposition," Proc. of 1998 IEEE Int. Conf. on Acoustics, Speech and Signal Processing, ICASSP '98, pp. 2969-2972, vol. 5.

Kutter, "Watermarking Resisting to Translation, Rotation, and Scaling," Proc. SPIE vol. 3528: Multimedia Systems and Applications, Nov. 1998, pp. 423-431.

Lin, et al, "Rotation, Scale, and Translation Resilient Public Watermarking for Images," Proc. SPIE vol. 3971: Security and Watermarking of Multimedia Contents II, Jan. 2000, pp. 90-98.

Lin, et al, "Rotation, Scale, and Translation Resilient Watermarking for Images," IEEE Transactions on Image Processing, vol. 10, No. 5, May 2001, pp. 767-782.

Matsui et al, "Embedding a Signature to Pictures Under Wavelet Transformation," Transactions of the Institute of Electronics Information and Communication Engineers D-II, vol. J79D-II, No. 6, Jun. 1996, pp. 1017-1024.

Matsui et al, "Use of the Wavelet Transformation to Embed Signatures in Images," Systems and Computers in Japan, Jan. 1997, vol. 28, No. 1, pp. 87-94.

Meerwald et al, "A Survey of Wavelet-domain Watermarking Algorithms", Security and Watermarking of Multimedia Contents III, Jan. 2001, vol. 4314, pp. 505-516.

Nikolaidis et al, "Region-Based Image Watermarking," IEEE Transactions on Image Processing, vol. 10, No. 11, Nov. 2001, pp. 1726-1740.

Ohnishi et al, Embedding a Seal into a Picture Under Orthogonal Wavelet Transform, Proceedings of Multimedia '96, 1996, IEEE, pp. 514-521.

Onishi et al, "A Method of Watermarking with Multiresolution Analysis and Pseudo Noise Sequences," Systems and Computers in Japan, vol. 29, No. 5, pp. 11-19, May 1998.

O'Ruanaidh et al, "Rotation, Scale and Translation Invariant Spread Spectrum Digital Image Watermarking," Signal Processing, vol. 66, May 1998, pp. 303-317.

Pereira et al, "Optimized Wavelet Domain Watermark Embedding Strategy Using Linear Programming", SPIE AeroSense 2000: Wavelet Applications, Apr. 2000.

Pereira et al, "Template Based Recovery of Fourier-Based Watermarks Using Log-Polar and Log-log Maps," Proc. IEEE Int. Conf. on Multimedia Computing and Systems, vol. 1, Jun. 1999, pp. 870-874.

Solachidis et al, "Circularly Symmetric Watermark Embedding in 2-D DFT Domain," 1999 IEEE, pp. 3469-3472.

Su et al, "An Image Watermarking Scheme to Resist Generalized Geometrical Transforms," Proc. SPIE vol. 4209: Multimedia Systems and Applications III, Nov. 2000, pp. 354-365.

Su et al, "Synchronized Detection of the Block-based Watermark with Invisible Grid Embedding," Proc. SPIE vol. 4314: Security and Watermarking of Multimedia Contents III, Jan. 2001, pp. 406-417.

Swanson et al, "Multiresolution Scene-Based Video Watermarking Using Perceptual Models," IEEE Journal on Selected Areas in Communications, May 1998, vol. 16, No. 4, pp. 540-550.

Swanson et al, "Multiresolution Video Watermarking Using Perceptual Models and Scene Segmentation," Proc. Int. Conf. on Image Processing, vol. 2, pp. 558-561, Oct. 1997.

Tsekeridou et al, "Embedding self-similar watermarks in the wavelet domain," Proceeding of the IEEE ICASSP 2000, Jun. 2000.

Tsekeridou et al, "Wavelet-Based Self-Similar Watermarking for Still Images", 2000 IEEE International Symposium on Circuits and Systems, Emerging Technologies for the 21.sup.st Century, May 2000, pp. 220-223.

Wei et al, "Perceptual Digital Watermark of Images Using Wavelet Transform," IEEE Trans. on Consumer Electronics, vol. 44, No. 4, Nov. 1998, pp. 1267-1272.

U.S. Appl. No. 09/343,101, filed Jun. 29, 1999, Bruce L. Davis, et al.
U.S. Appl. No. 09/343,104, filed Jun. 29, 1999, Tony F. Rodriguez, et al.
U.S. Appl. No. 09/552,998, filed Apr. 19, 2000, Hannigan et al.
U.S. Appl. No. 09/567,405, filed May 8, 2000, Carr et al.
U.S. Appl. No. 09/629,649, filed Aug. 1, 2000, J. Scott Carr, et al.
U.S. Appl. No. 09/689,289, filed Oct. 11, 2000, Carr et al.
U.S. Appl. No. 09/633,587, filed Aug. 7, 2000, Geoffrey B. Rhoads, et al.
U.S. Appl. No. 09/413,117, filed Oct. 6, 1999, Geoffrey B. Rhoads.
U.S. Appl. No. 09/482,749, filed Jan. 13, 2000, Geoffrey B. Rhoads.
U.S. Appl. No. 09/507,096, filed Feb. 17, 2000, Davis, et al.
U.S. Appl. No. 09/697,015, filed Oct. 25, 2000, Bruce L Davis, et al.
U.S. Appl. No. 09/697,009, filed Oct. 25, 2000, Bruce L. Davis, et al.
U.S. Appl. No. 13/084,981, filed Apr. 12, 2011, Geoffrey B. Rhoads.

* cited by examiner

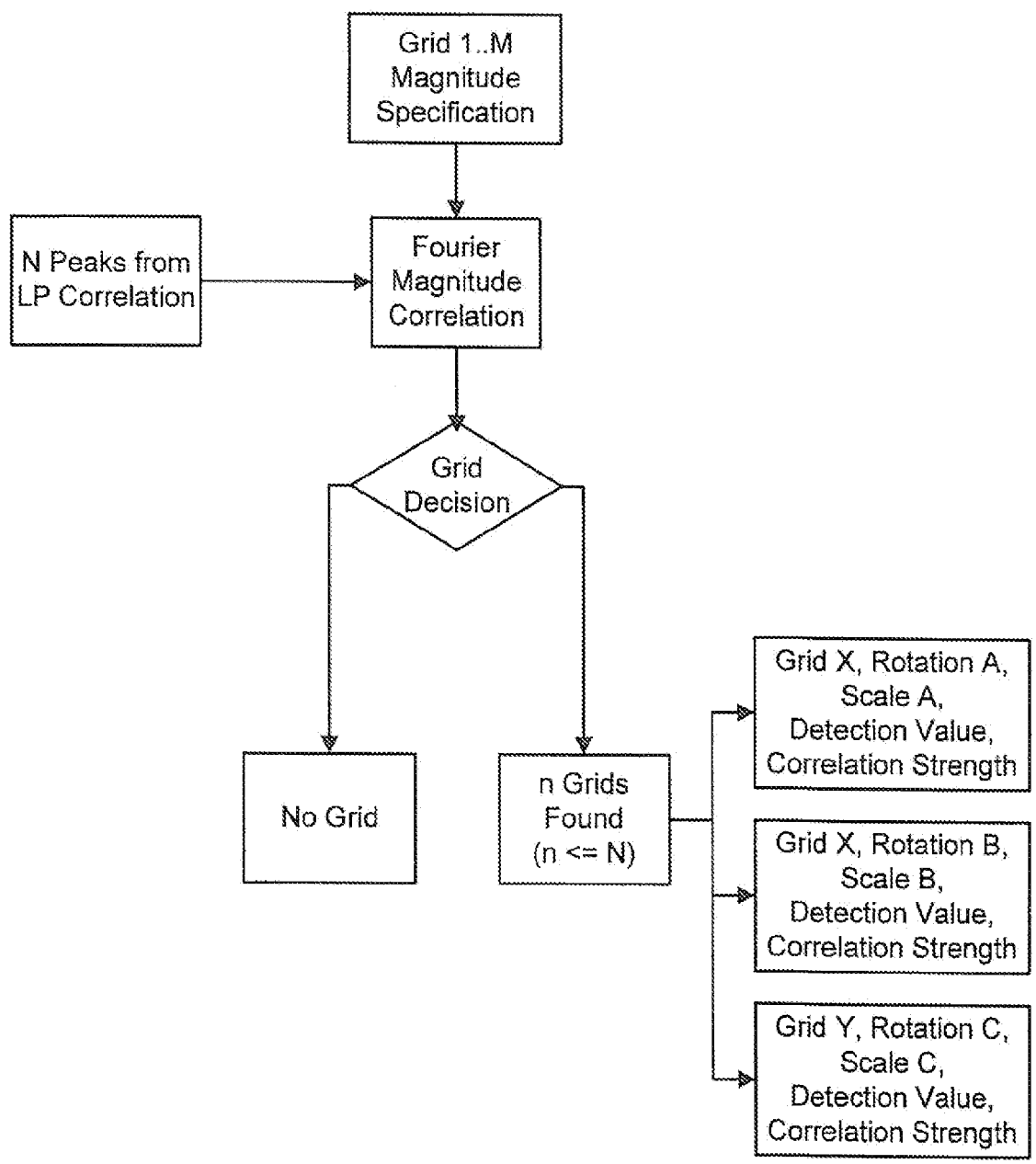

WATERMARK SYNCHRONIZATION SIGNALS CONVEYING PAYLOAD DATA

CROSS-REFERENCE TO RELATED APPLICATION

This application is a continuation of U.S. patent application Ser. No. 11/302,974, filed Dec. 13, 2005 (now U.S. Pat. No. 7,657,058), which is a continuation-in-part of U.S. patent application Ser. No 10/032,282, filed Dec. 20, 2001 (now U.S. Pat. No. 6,975,744), which claims priority benefit to U.S. provisional application 60/257,924, filed Dec. 21, 2000. U.S. patent application Ser. No. 11/302,974 is also a continuation-in-part of U.S. patent application Ser. No. 10/333,344, filed Jul. 24, 2003 (now U.S. Pat. No. 7,319,775), which is a national-phase counterpart to PCT application PCT/US01/22173, filed Jul. 12, 2001, which claims priority to U.S. patent application Ser. No. 09/618,948, filed Jul. 19, 2000 (now U.S. Pat. No. 6,385,329).

FIELD OF THE INVENTION

The present invention relates to digital watermark technology, and particularly concerns situations in which several digitally watermarked objects are presented to a watermark detector.

BACKGROUND AND SUMMARY OF THE INVENTION

Digital watermarking systems are known in the art, and are shown, e.g., in application Ser. Nos. 09/503,881 (now U.S. Pat. No. 6,614,914) and 09/452,023 (now U.S. Pat. No. 6,408,082).

Steganographic calibration signals (sometimes termed "orientation signals," "marker signals," reference signals," "grid signals," etc.) are sometimes included with digital watermarking signals so that subsequent distortion of the object thereby marked (e.g., a digital image file, audio clip, document, etc.) can later be discerned and compensated-for. Such arrangements are detailed in the cited applications.

Systems for detecting watermarks from marked objects sometimes fail if the image object encompasses several separately-watermarked components (e.g., a scanned magazine page with several different images, or photocopy data resulting from scanning while several documents are on the photocopier platen, as shown in FIG. 1). Each component may include its own calibration signal, confusing the detection system.

In accordance with certain embodiments of the present invention, this problem is addressed by a proximity-based approach, and/or a multiple grids-based approach. In accordance with other embodiments of the present invention, the calibration signal can—itself—convey the watermark information, so it serves both a calibration and a payload-conveyance function.

The foregoing and additional features and advantage of the present invention will be more readily apparent from the following detailed description, which proceeds with reference to the accompanying drawings.

BRIEF DESCRIPTION OF THE DRAWINGS

FIG. 3 is a flow chart further detailing the embodiment of FIG. 2.

DETAILED DESCRIPTION

For expository convenience, the following discussion focuses on the context of processing image data resulting from scanning several documents on the same photocopier platen. It should be recognized, however, that the invention is not so limited, but finds application, e.g., in contexts involving audio, video and other content objects.

Proximity Approach

The proximity approach is based on selecting and clubbing together image blocks that are in close proximity to each other. For two watermarked documents in an image, this approach would ideally give two clusters of blocks, one for each watermark. This approach requires modification to the methodology described in the '881 application. The prior methodology calculated the variance and edges in each block and used these to compute a metric for the block. Blocks were ranked based on their metric, and the top M blocks are selected to perform grid detection. The proximity approach, in contrast, takes into account the spatial locations of the blocks, and/or their distances to each other, for division into one or more clusters.

Such a proximity approach has several advantages. These include:

Separate block clusters can be treated as independent sets of data for grid detection and further decoding.

Except for the block clustering and proximity determination, prior art techniques (e.g., as in the '881 application) can remain unchanged.

Although the proximity-based approach overcomes many of the shortcomings of the prior art, it has attributes that may render it poorly suited for certain applications. For example:

The proximity approach may result in blocks from a single watermarked document being divided into more than one cluster.

The proximity approach may fail for multiple watermarked documents that are either overlapped or in close proximity to each other.

The extensibility of this approach to situations where the number of watermarked components is more than two or three is uncertain.

These shortcomings are generally obviated by the multiple grids approach.

Multiple Grids Approach

The multiple grids approach tackles the problem by searching for multiple grids during grid detection. The approach is based on the notion that if there is more than one watermarked component, the accumulated Fourier magnitude should contain a grid signal corresponding to each watermark. The presence of multiple grids generates multiple strong peaks both at the log-polar correlation and Fourier magnitude correlation steps in the process. Each peak corresponds to the rotation and scale of the corresponding grid.

Figure 2:
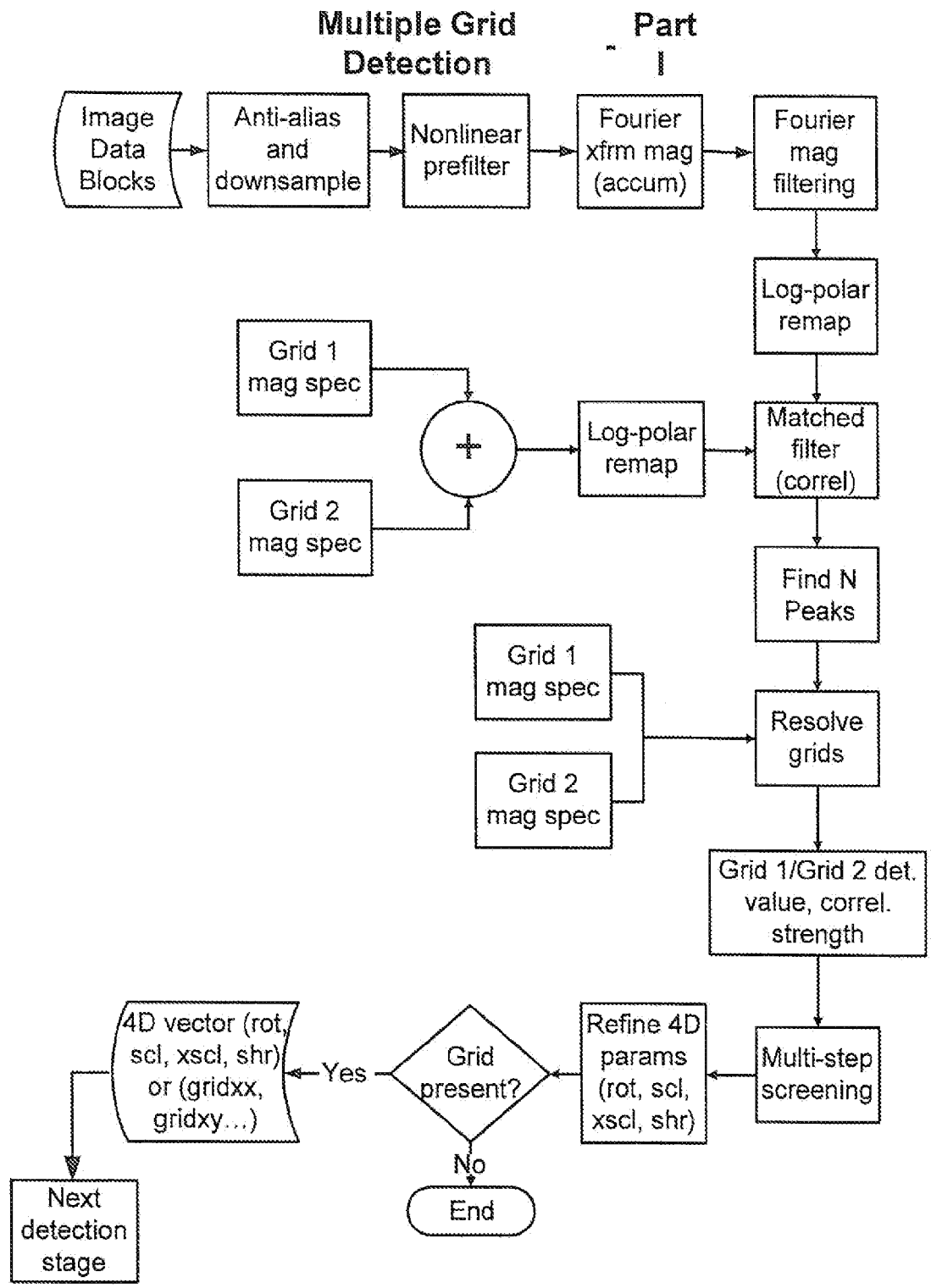
FIG. 2 is a flow chart detailing one embodiment of a multiple-grid detection approach.

The multiple grids approach can include certain of the steps detailed in FIGS. 2 and 3, which include the following:

Segment the image into blocks;

Apply a non-linear prefilter that estimates the image data (from the image+watermark input data) and subtracts its from the input data. (Estimation can be performed using the host signal estimation technique disclosed in application Ser. No. 09/278,049.)

Compute the detection value corresponding to each of the N (e.g., 2-16) candidates in the Fourier Magnitude Correlation (FMC) step.

Select the M candidates that surpass the two-step rejection criterion.

Try refining scale/rotation on these M candidates to obtain refined rotation and scale as well as differential scale and shear (i.e., a 4D refinement vector).

Loop through the M 4D vector sets and perform translation determination and read (decode) operations for each, using all available blocks.

Buffer the decoded watermark information from each of the M candidates (i.e., read or not read, if read what type of watermark, and so on).

Either return this information to the calling program, or select the watermark to return to the calling program based upon a pre-determined priority ranking of the various possible watermarks.

This approach works as long as there is sufficient signal strength corresponding to each potential grid in the accumulated Fourier magnitude. Also note that this approach assumes that all the watermarks in the image have the same grid. Experiments using this approach have yielded promising results and shown that this approach is feasible.

Such an approach has various advantages, including:

It enables detection of multiple watermarks even if the multiple watermarked documents are overlapped or in close proximity to each other.

It does not affect the performance (speed) of the grid detection stage.

Most of the methodology parallels prior art techniques; the sequence of operations after the grid detection stage need to be repeated for each detected grid.

It is possible to extend this approach to situations where there are more than two or three watermarked components in an image.

A few shortcomings persist:

If the multiple watermarks are weak, it may be difficult to detect them in the accumulated Fourier magnitude.

One challenge in this approach arises if the multiple grids have almost the same rotation and scale. This limitation arises because the peak finding algorithm cannot resolve closely located peaks in the GMF correlation plane.

The two-step rejection criteria noted above is more particularly detailed in application Ser. No. 09/526,982 (now U.S. Pat. No. 6,516,079).

An exemplary grid signal is one with the following characteristics:

It comprises a collection of impulse or delta functions in the Fourier magnitude domain.

The impulse functions have pseudo random phase (i.e. the phase is random, yet known so that translation (its X and Y origin) of the watermark can be computed by correlating the phase information of the calibration signal with the watermarked signal)

The impulse functions are typically distributed in the mid-frequency range so as to survive distortion yet not be perceptible In other embodiments, different grid signals can be used in differently-watermarked excerpts of the content. FIGS. 2 and 3 more particularly detail a detection process useful in this context.

As before, the image is segmented into blocks, pre-filtered, the converted into the Fourier domain. The Fourier representation for all the component blocks are accumulated, filtered, and remapped into the log-polar domain.

In contrast to the multiple-same grid context, the multiple-different grid context process proceeds by correlating the log-polar representation obtained above, with a log-polar remapping of the Fourier magnitude representation of each of the component grid signals, summed together (a summed-grid template). This correlation yields several peaks, each indicating a candidate scale/rotation state of one of the component watermarked elements. But the peaks do not indicate the particular grid signals with which they correlated, since the correlation was based on a summed-grid template. Accordingly, the method proceeds by checking each discerned scale/rotation state (correlation peak) of the data against the Fourier magnitude spectrum of the different grid signals, to determine which grid signal should be used in decoding a given scale/rotation state of the data. Once this association between scale/rotation states of data, and applicable grid signal, has been determined, decoding of each can proceed as above (and in the cited applications).

Of course, for any single grid signal, there may be several objects represented in the data set—each with a different scale or rotation.

In accordance with yet another aspect of the invention, the impulse functions can be modulated to carry auxiliary information as follows:

Encode:

a. create message (e.g., binary bit string)

b. error correction encode and/or spread spectrum modulate the string c. map elements of resulting message signal to fourier magnitude impulse function locations d. encode 1 as positive impulse function and encode 0 as negative impulse function (or other predetermined relation)

Detect and Decode Message:

a. detect impulses to determine whether a watermark is present;

b. if detected, then go back and check for the presence at predetermined Fourier Magnitude impulse function locations;

c. perform inverse of spread spectrum modulation and error correction coding to recover original message Note that there are many possible applications: The calibration signal can carry protocol information to tell the decoder how to interpret the message payload of another watermark signal.

In systems in which the "grid" signal conveys the message, there is no need for separate "grid" and "message" signals.

For additional information on the use of the grid signal to convey payload information, see application Ser. No. 09/618,948 (now U.S. Pat. No. 6,385,329).

Thus, for example, one embodiment is a method of encoding a digital content object with a watermark that represents both payload data and calibration data, where the method includes:

defining a grid signal comprising a plurality of components in the Fourier domain;

setting the polarities of said components in accordance with payload data to be represented thereby; and combining said grid signal with the digital content object to digitally watermark same In such an arrangement, affine transformation of the digital content object can be discerned from affine transformation of the grid signal, and the payload can be discerned from the polarities of the grid signal components.

In the foregoing embodiment, the watermark may include other components in addition to those of which the grid signal is comprised. These other components can serve to convey additional payload data.

The payload data represented by the polarities of said grid signal components can convey various types of information, such as protocol information.

Having described and illustrated the principles of our inventive work with reference to specific embodiments, it will be recognized that the principles thereof can be implemented in other, different, forms.

For example, while the disclosure focused on image data, the same techniques are applicable in other watermarking contexts, including audio and video.

Moreover, while the invention was illustrated in the context of the present assignee's preferred forms of watermarking, it should be recognized that the invention's applicability is not so limited. For example, such techniques also find utility in combination with the teachings of watermarking U.S. Pat. Nos. 5,949,055, 6,044,182, etc.

It should be recognized that the particular combinations of elements and features in the above-detailed embodiments are exemplary only; the interchanging and substitution of these teachings with other teachings in this and the incorporated-by-reference patents/applications are also contemplated.

As is familiar to those skilled in the arts, all of the foregoing methods may be performed using dedicated hardware components/systems for the various devices, and/or through use of processors programmed in accordance with firmware or software, etc. In the latter case the processors may each include a CPU and associated memory, together with appropriate input and output devices/facilities. The software can be resident on a physical storage media such as disks, and can be loaded into the processors' memory for execution. The software includes instructions causing the CPU to perform the various processes detailed above.

To provide a comprehensive disclosure without unduly lengthening this specification, the patents and applications cited above are incorporated herein by reference.

In view of the wide variety of embodiments to which the principles of our inventive work can be applied, it should be recognized that the detailed embodiments are illustrative only and should not be taken as limiting the scope of the invention. Rather, we claim as our invention all such embodiments as may come within the scope and spirit of the following claims, and equivalents thereof.

I claim:

1. A method of altering audio data to steganographically encode a digital watermark therein, the watermark having a synchronization signal component that facilitates subsequent discernment of a transformation to which the encoded audio has been subjected, the watermark also including a payload component that conveys plural bits of payload data, wherein the method includes using a processor device to process the synchronization signal component to serve as a carrier of bits of payload data.

2. The method of claim 1 in which the synchronization signal component comprises a collection of discrete functions distributed in the Fourier magnitude domain.

3. The method of claim 1 wherein bits of data carried by the synchronization signal instruct a decoder how to interpret other payload data.

4. A method of decoding audio data that has been steganographically encoded in accordance with a digital watermark, the method including analyzing a synchronization signal component of said digital watermark to establish a state of said content object, and by reference to said state, decoding plural-bit payload data from a payload component of said digital watermark, wherein the method includes using a processor device to decode plural-bit payload data from said synchronization signal.

5. The method of claim 4 in which the synchronization signal component comprises a collection of discrete functions distributed in the Fourier magnitude domain of the encoded audio data.

6. The method of claim 4 that further includes using bits of payload data decoded from the synchronization signal to instruct a decoder how to interpret other payload data.

* * * * *

UNITED STATES PATENT AND TRADEMARK OFFICE
CERTIFICATE OF CORRECTION

| | |
|---|---|
| PATENT NO. | : 8,301,453 B2 |
| APPLICATION NO. | : 12/692451 |
| DATED | : October 30, 2012 |
| INVENTOR(S) | : Sharma |

It is certified that error appears in the above-identified patent and that said Letters Patent is hereby corrected as shown below:

On the Title Page, Item (56), under "OTHER PUBLICATIONS", Line 1, delete "al," and insert -- al., --, therefor at each occurrence throughout the other publications.

On the Title Page, Item (57), under "ABSTRACT", Line 2, delete "reference" and insert -- "reference --, therefor.

On Title Page 3, Item (56), under "OTHER PUBLICATIONS", Line 54, delete "L" and insert -- L. --, therefor.

Figure 1:
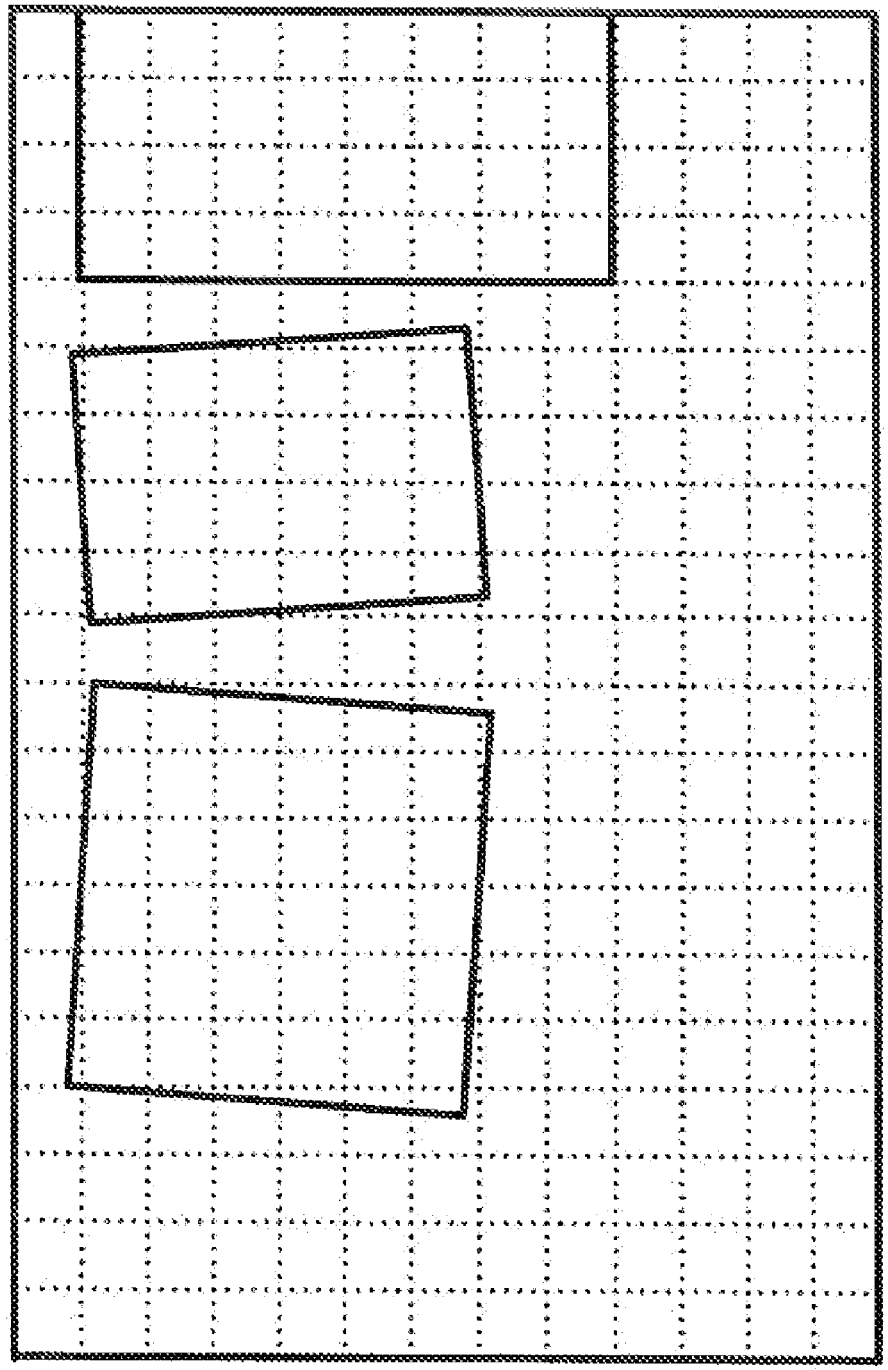
FIG. 1 shows several documents as they may be positioned on the platen of a photocopier.

In Fig. 1, Sheet 1 of 3, delete "FIG" and insert -- FIG. --, therefor at each occurrence throughout the drawings.

In Column 1, Line 36, delete "reference" and insert -- "reference --, therefor.

In Column 1, Lines 52-56, delete "In accordance with other embodiments of the present invention, the calibration signal can–itself–convey the watermark information, so it serves both a calibration and a payload-conveyance function." and insert the same at Line 53 as a new paragraph.

In Column 2, Line 59, delete "blocks;" and insert -- blocks. --, therefor.

In Column 2, Line 61, delete "its" and insert -- it --, therefor.

In Column 3, Line 52, delete "signal)" and insert -- signal). --, therefor.

In Column 3, Line 55, delete "perceptible" and insert -- perceptible. --, therefor.

In Column 3, Line 61, delete "the converted" and insert -- then converted --, therefor.

In Column 4, Line 29, delete "relation)" and insert -- relation). --, therefor.

Signed and Sealed this
Second Day of April, 2013

Teresa Stanek Rea
*Acting Director of the United States Patent and Trademark Office*

CERTIFICATE OF CORRECTION (continued)
U.S. Pat. No. 8,301,453 B2

In Column 4, Line 37, delete "message" and insert -- message. --, therefor.

In Column 4, Line 56, delete "same" and insert -- same. --, therefor.